US009049946B1

(12) United States Patent
Tyler et al.

(10) Patent No.: US 9,049,946 B1
(45) Date of Patent: Jun. 9, 2015

(54) INFANT COVERING BLANKET ADAPTED FOR USE WITH INFANT SUPPORTING APPARATUSES

(71) Applicant: TYLER TWO, LLC, Crestwood, KY (US)

(72) Inventors: Sara Tyler, Crestwood, KY (US); Brian Tyler, Crestwood, KY (US)

(73) Assignee: TYLER TWO, LLC, Crestwood, KY (US)

( * ) Notice: Subject to any disclaimer, the term of this patent is extended or adjusted under 35 U.S.C. 154(b) by 199 days.

(21) Appl. No.: 13/787,266

(22) Filed: Mar. 6, 2013

(51) Int. Cl.
*A47C 31/11* (2006.01)
*A47D 15/00* (2006.01)
*B60N 2/60* (2006.01)

(52) U.S. Cl.
CPC ............... *A47D 15/00* (2013.01); *B60N 2/6063* (2013.01); *B60N 2/60* (2013.01)

(58) Field of Classification Search
CPC ................................. B60N 2/60; B60N 2/6063
USPC ....................................................... 297/219.12
See application file for complete search history.

(56) References Cited

U.S. PATENT DOCUMENTS

| 4,172,300 | A | * | 10/1979 | Miller ................................. 5/424 |
| D267,284 | S | | 12/1982 | Andrews |
| 4,946,221 | A | | 8/1990 | Livingston |
| 5,243,724 | A | * | 9/1993 | Barnes ................. 297/219.12 X |
| 5,432,965 | A | | 7/1995 | Espinoza |
| D384,188 | S | | 9/1997 | Imm |
| D388,998 | S | | 1/1998 | Dubiel |
| D395,372 | S | | 6/1998 | Simpson |
| D399,676 | S | | 10/1998 | Gerlach |
| 5,897,164 | A | | 4/1999 | Kagan et al. |
| 5,950,261 | A | | 9/1999 | Hay et al. |
| 5,988,742 | A | | 11/1999 | Stevens |
| 6,012,184 | A | | 1/2000 | Childers |
| 6,019,421 | A | | 2/2000 | Roh |
| 6,209,953 | B1 | | 4/2001 | Mackay et al. |
| D447,902 | S | | 9/2001 | Black |
| 6,394,543 | B1 | | 5/2002 | Dunne et al. |
| 6,481,791 | B1 | | 11/2002 | Facchini et al. |
| D477,744 | S | | 7/2003 | Kelly |
| 6,749,258 | B1 | | 6/2004 | Leikin |
| 6,796,263 | B2 | | 9/2004 | Meyer |
| D525,067 | S | | 7/2006 | Miller |
| 7,097,244 | B2 | * | 8/2006 | Holmgren et al. ....... 297/219.12 |
| D530,559 | S | | 10/2006 | Fails |
| 7,192,086 | B2 | | 3/2007 | Davis et al. |
| D546,108 | S | | 7/2007 | Heiman-Philpott |

(Continued)

OTHER PUBLICATIONS

Mama on a Green Mission; <URL: http:// mamaonagreenmission. com/2011/10/splendipity-review-giveaway-baby-must.html>; Oct. 31, 2011; "Splendipity" infant cover.

(Continued)

*Primary Examiner* — Rodney B White
(74) *Attorney, Agent, or Firm* — Wyatt, Tarrant & Combs, LLP; Matthew A. Williams (57) ABSTRACT

A blanket for covering an infant in an infant supporting apparatus having one or more restraints to retain the infant in said infant supporting apparatus, said blanket comprising: a flexible panel having an interior surface that is adjacent to the infant when said blanket is in use and at least one strap for attaching said blanket to at least one of said one or more restraints, said at least one strap being affixed to the flexible panel and adjacent to the interior surface of the flexible panel.

12 Claims, 10 Drawing Sheets

(56) References Cited

U.S. PATENT DOCUMENTS

| | | | |
|---|---|---|---|
| 7,284,790 | B1 | 10/2007 | Brewer |
| D559,022 | S | 1/2008 | Morales Cabello |
| D562,612 | S | 2/2008 | Simpson et al. |
| 7,384,098 | B1 | 6/2008 | Allwin |
| 7,431,395 | B2 | 10/2008 | Morgan et al. |
| D610,854 | S | 3/2010 | Siklosi et al. |
| D653,885 | S | 2/2012 | Longnecker |
| 8,113,580 | B1 | 2/2012 | Pusateri |
| 8,118,364 | B2 | 2/2012 | Davis |
| 8,191,188 | B2 * | 6/2012 | Kaplan et al. .................... 5/485 |
| D673,784 | S | 1/2013 | Lang |
| D676,220 | S | 2/2013 | Bostajian |
| D683,169 | S | 5/2013 | Lang et al. |
| D691,835 | S | 10/2013 | Tyler et al. |
| D696,053 | S | 12/2013 | Lang et al. |
| D698,326 | S | 1/2014 | Choi |
| 2005/0082996 | A1 | 4/2005 | Luebbe |
| 2012/0084917 | A1 | 4/2012 | Wiggins |
| 2013/0015689 | A1 * | 1/2013 | Maclary et al. .......... 297/219.12 |
| 2014/0021751 | A1 | 1/2014 | Lang et al. |

OTHER PUBLICATIONS

BlankieRoo; <URL: http://www.blankieroo.com/>; Oct. 11, 2012; "BlankieRoo" infant cover.

Babee Covee; <URL: http://babeecovee.com/products.php?cat=7>, Jul. 27, 2013; "Babee Covee" infant cover.

BlankieRoo; <URL:http://www.blankieroo.com/Our_Story.html>; Aug. 10, 2014; Proof of Inventorship, Sara Tyler.

\* cited by examiner

INFANT COVERING BLANKET ADAPTED FOR USE WITH INFANT SUPPORTING APPARATUSES

CROSS-REFERENCE TO RELATED APPLICATIONS

Not Applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention generally relates to blankets for covering infants in an infant seating apparatus, and more particularly to blankets adapted for use with infant seating apparatuses that prevent the infant from (i) uncovering itself and (ii) covering its mouth and nose with the blanket.

2. General Background of the Invention

The law in most states or safety standards or both generally require infants to be restrained in whatever type of seating apparatus they are placed in, be it a car seat, a swing, a stroller, a vibrating seat, a bouncy seat, or the like. Each different apparatus, including apparatuses of the same general type made by different manufacturers, may have a different type of restraint system, a different peripheral dimension, or different handles for lifting or pushing the apparatus. Accordingly, known blankets for covering infants in car seats, strollers, vibrating seats, and the like are generally specifically designed for use with a specific type of apparatus by including special slits or openings to accept handles or other features of a specific apparatus. Such devices may not be effectively usable with other types of seating apparatuses. Other known types of blankets for covering infants in an infant seating apparatus include openings in the blanket for portions of the restraint system to pass through such that the restraint system secures the blanket. This, however, presents an issue in that the additional bulk of the blanket is placed between the infant and the restraint system. Should the blanket get bunched up between the restraint system and the blanket, this could cause injury to the infant in an impact situation. Moreover, such a design has the additional downside that the restraints must be released to remove the blanket from the infant. In addition, many other known designs do not prevent an infant from kicking or throwing the blanket off of itself and do not prevent an infant from covering its mouth and nose, creating a risk of asphyxiation. Other known blankets cover the base portion of vibrating seats, bouncy seats, and the like, thereby precluding access to the controls for the seating apparatus.

What is needed, then, is a blanket for covering an infant in an infant seating apparatus that permits the blanket to be easily secured to the restraint system without having to disengage and reengage said restraint system in a manner that does not result in the bulky blanket material being bunched between the restraint system and the infant. Said blanket should further permit a single blanket to be used with a wide variety of infant searing apparatuses in such a way that the infant (i) cannot uncover itself or (ii) cover its mouth and nose with the blanket. Said blanket may still further permit access to controls associated with the infant seating apparatus without having to remove all or a portion of the blanket.

SUMMARY OF THE INVENTION

A blanket for covering an infant in an infant supporting apparatus having one or more restraints to retain the infant in said infant supporting apparatus, said blanket comprising: a flexible panel having an interior surface that is adjacent to the infant when said blanket is in use and at least one strap for attaching said blanket to at least one of said one or more restraints, said at least one strap being affixed to the flexible panel and adjacent to the interior surface of the flexible panel.

BRIEF DESCRIPTION OF THE DRAWINGS

For a further understanding of the nature, objects, and advantages of the present invention, reference should be had to the following detailed description, read in conjunction with the attached figures, wherein like reference numerals denote like elements and wherein.

DETAILED DESCRIPTION OF THE INVENTION

This invention relates to a blanket for covering an infant when the infant is in an infant supporting apparatus such as an infant seat, a vibrating infant seat, an infant seat that allows the infant to move in a bouncing motion, an infant carrier, an infant car seat, or a stroller, and more particularly for use with an infant supporting apparatus that includes a restraint system for restraining the infant in the apparatus. Such infant supporting apparatuses are designated "A" in the various figures and form no part of the present system. Restraint systems used with infant seating apparatuses A are well known in the art and generally a variety of multipoint harness systems that involve the use of flexible belts or similar devices that snap together. Such restraint systems are highly regulated and well known to those of skill in the art. In the various figures, the restraint system is indicated by the designation "R" and forms no part of the present invention.

Blanket 10 comprises flexible panel 12 and blanket-retaining straps 50. Flexible panel 12 further comprises an interior surface 14 that faces toward the infant when in use. Accordingly, when blanket 10 is in use various portions of interior surface 14 are adjacent to the infant, restraint system R, and infant seating apparatus A. Interior surface 14 is preferably formed from a material that will not irritate the infant's skin; examples of such materials include polyester and cotton.

Flexible panel 12 still further comprises outer surface 16, which opposes interior surface 14 and faces away from the infant when blanket 10 is in use. Outer surface 16 can be formed from any suitable flexible material for the particular use blanket 10 is intended for. For example, when blanket 10 is intended for interior use, for example with an infant supporting apparatus A that is a vibrating infant seat, outer surface 16 may be formed from the same non-irritating material used to form inner interior surface 14. In contrast, where blanket 10 is intended for use with an infant supporting apparatus A that is a stroller, outer surface 16 may be formed from a material that is wind and water resistant.

Flexible panel 10 may also include an insulating material (not shown) between inner surface 14 and outer surface 16. The various methods and constructions applicable to creating a blanket from a combination of flexible materials, including the optional inclusion of an insulating material between opposing surfaces formed of differing materials, is, however, well known in the art and is not the subject of this invention.

Figure 7:
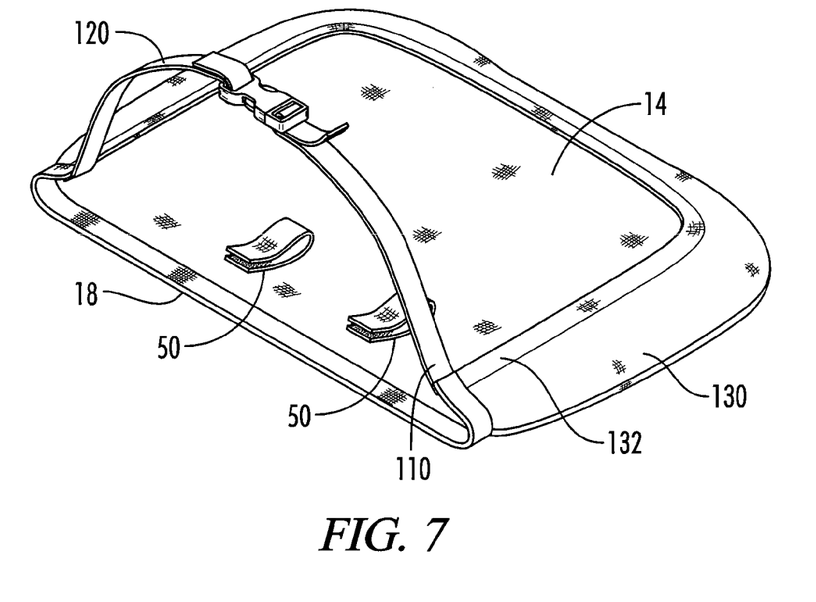
FIG. 7—is a bottom perspective view of an embodiment of the invention.
Figure 8:
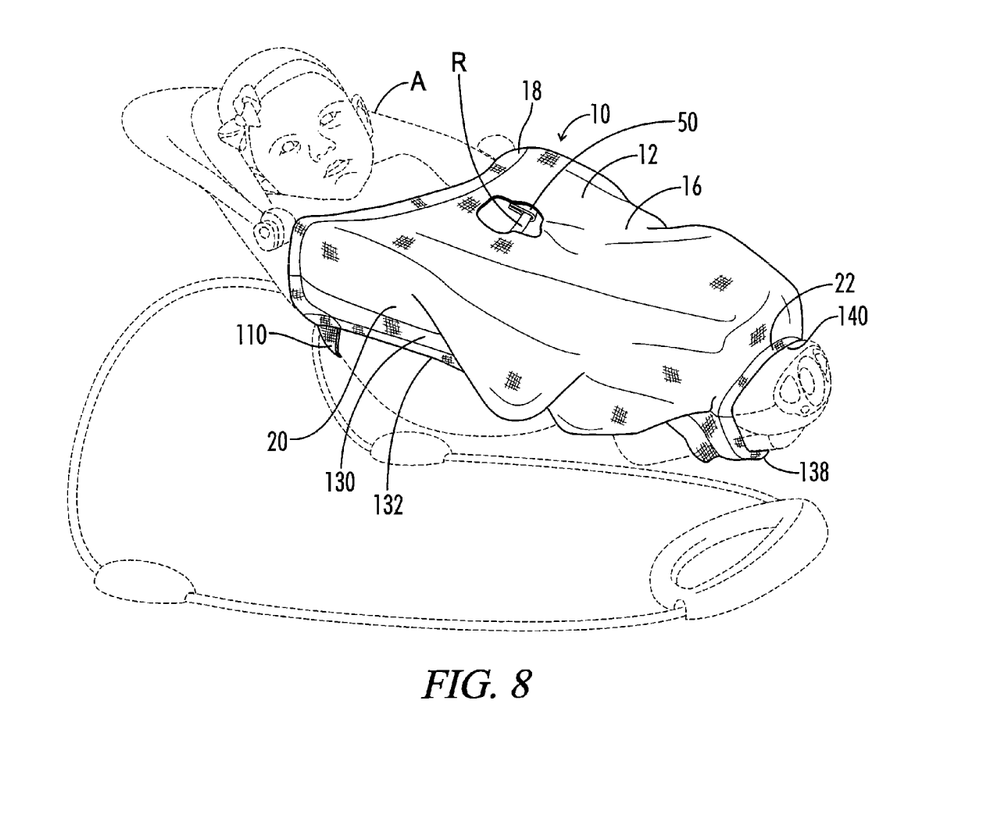
FIG. 8—is a perspective view of an embodiment of the invention installed on a first type of infant seating apparatus.
Figure 9:
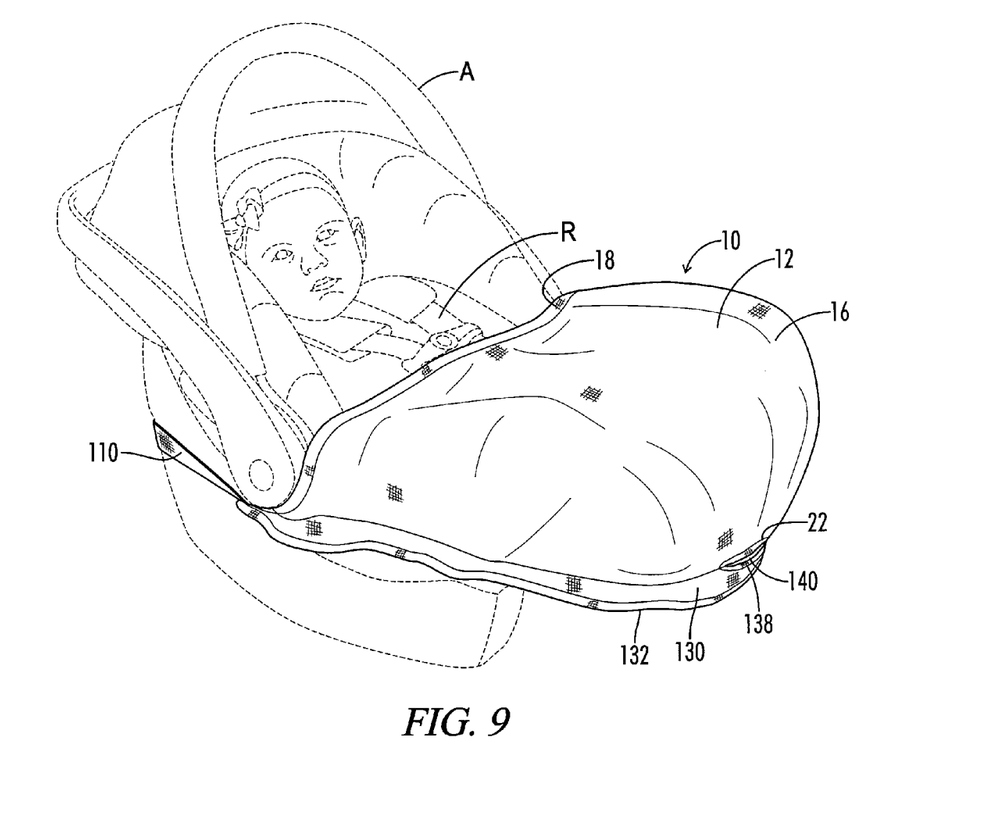
FIG. 9—is a perspective view of an embodiment of the invention installed on a second type of infant seating apparatus.
Figure 10:
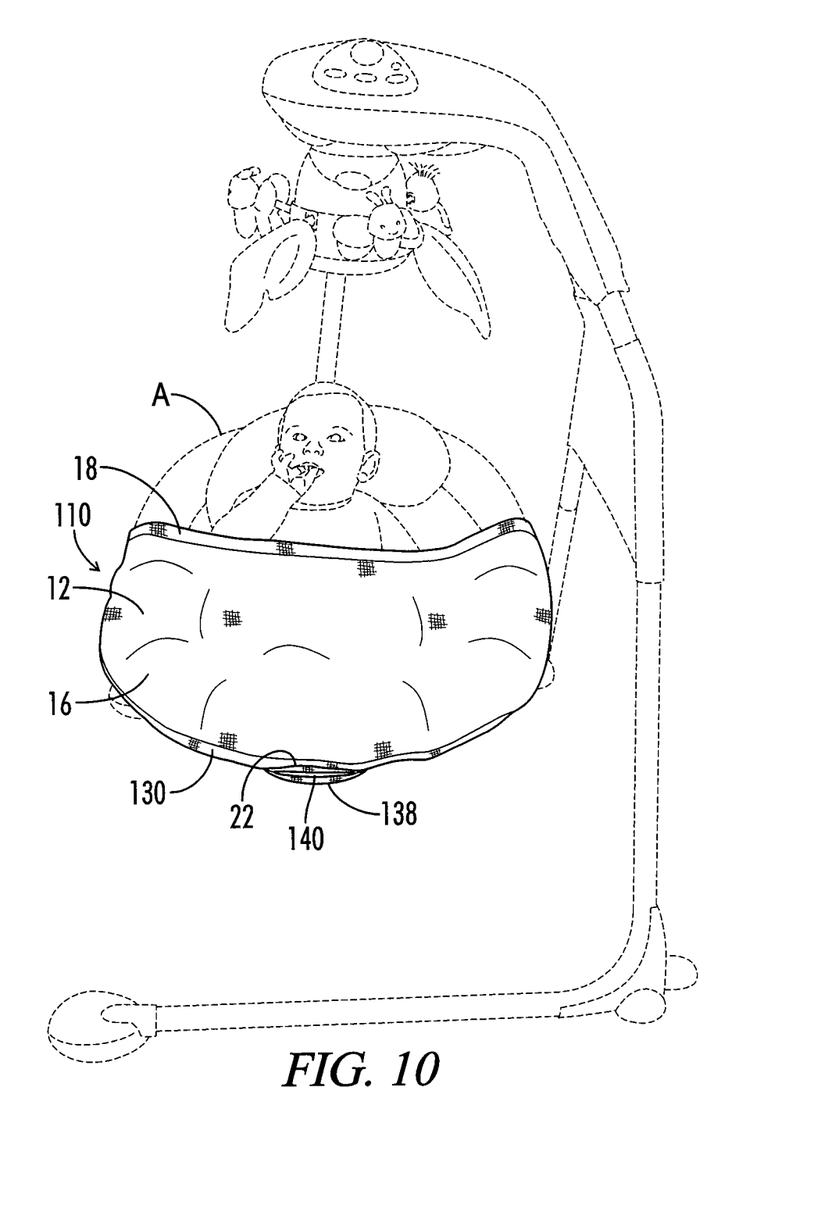
FIG. 10—is a perspective view of an embodiment of the invention installed on a third type of infant seating apparatus.
Figure 11:
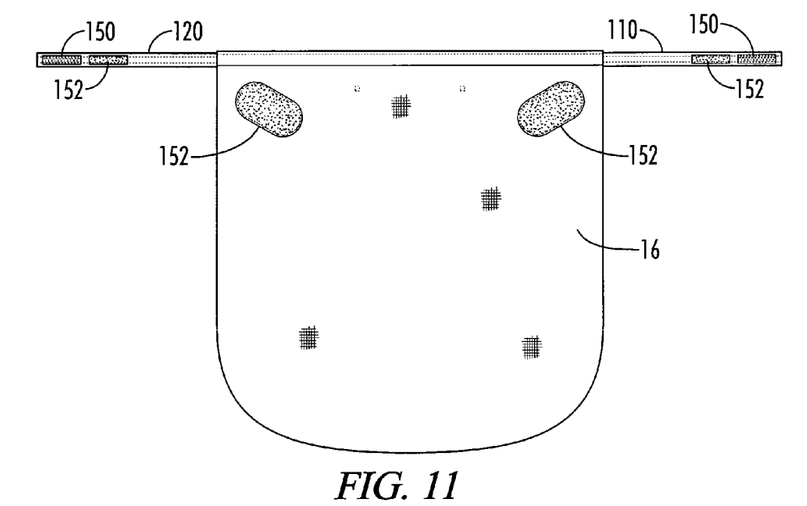
FIG. 11—is a top view of an embodiment of the invention.
Figure 12:
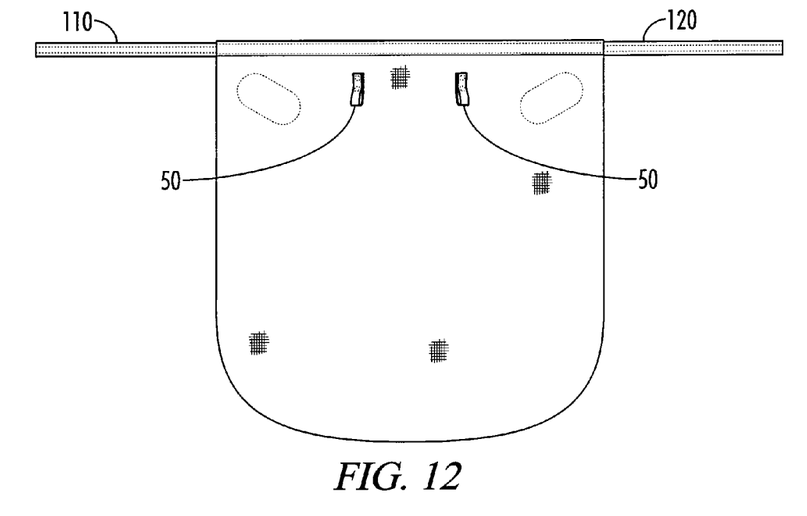
FIG. 12—is a bottom view of an embodiment of the invention.
Figure 13:
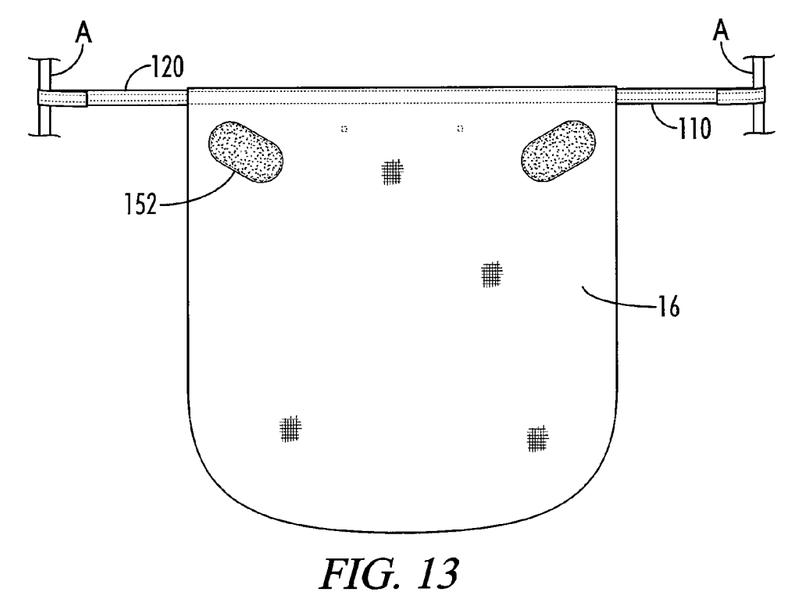
FIG. 13—is a top view of the embodiment of the invention illustrated in FIG. 11 showing one method of attachment to an infant seating apparatus.
Figure 14:
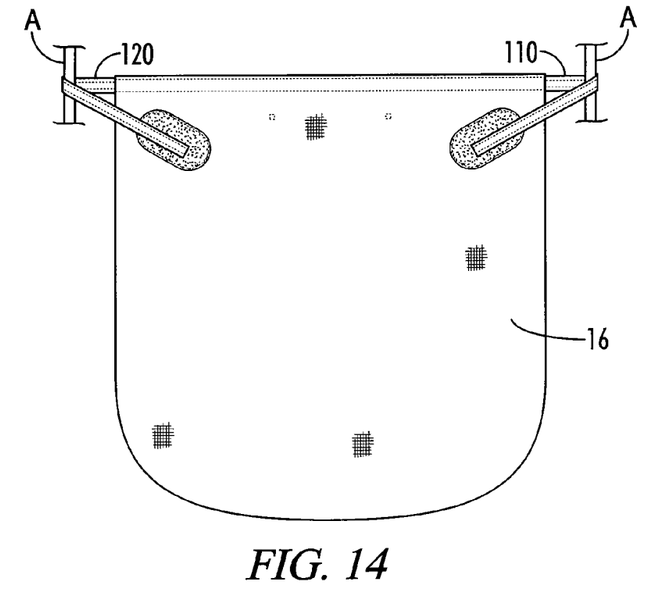
FIG. 14—is a top view of the embodiment of the invention illustrated in FIG. 11 showing a second method of attachment to an infant seating apparatus.
Figure 15:
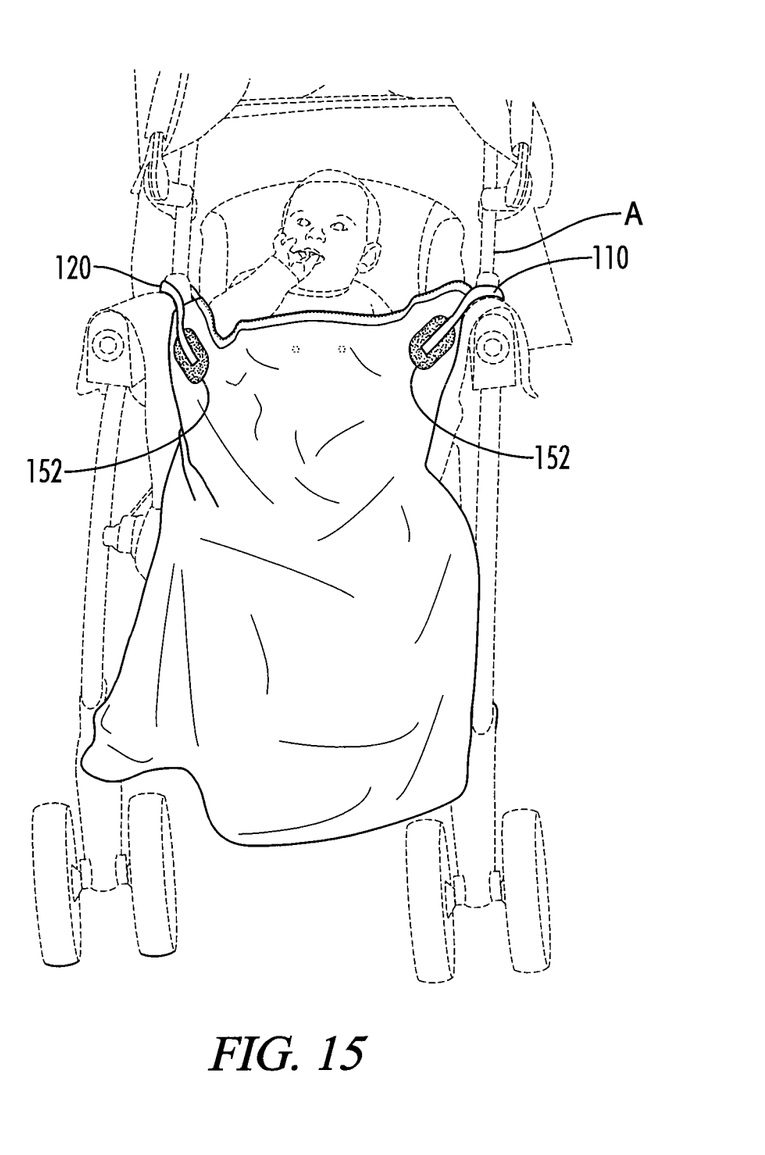
FIG. 15—is a perspective view of the embodiment of the invention illustrated in FIG. 11 installed on an infant seating apparatus.

Flexible panel 12 still further comprises upper perimeter portion 18 and lower perimeter portion 20. As best seen in FIG. 7, upper perimeter portion 18 extends along an upper portion of flexible panel 12 that extends generally transversely across an upper portion of the infant's torso when blanket 10 is in use. Lower perimeter portion 20 extends along the edge of flexible panel 12 from a first end portion of upper perimeter portion 18 to a second, opposing end portion of upper perimeter portion 18. Upper perimeter portion 18 preferably further comprises an elastic material.

Blanket-retaining straps 50 are located adjacent to interior surface 14 of flexible panel 12. Blanket-retaining straps 50 serve to prevent the infant from kicking or throwing blanket 10 off of the infant and the infant supporting apparatus A when blanket-retaining straps 50 are engaged with restraint system R. Blanket-retaining straps 50 are located such that the infant cannot relocate blanket 10 to cover the infant's mouth and nostrils when blanket-retaining straps 50 are engaged with restraint system R. In the accompanying figures, blanket-retaining straps 50 are shown as being two (2) in number to reflect the inventors' preference. But any number of blanket-retaining straps 50, including one (1), may be used so long as blanket-retaining strap or straps 50 are capable of preventing the infant from (i) kicking or throwing blanket 10 off of itself and the infant supporting apparatus A and (ii) lifting blanket 1 to cover its mouth and nostrils when blanket-retaining straps 50 are engaged with restraint system R.

In the illustrated embodiments, blanket-retaining straps 50 are further shown as flexible straps that are secured with hook and loop fasteners such as Velcro®. As with the number of blanket-retaining straps 50 that are used, this particular structure for securing a strap is shown because it is the preference of the inventors. Those of skill in the art will readily recognize that there are any number of other structures that can be used for such purposes, including, but not limited to, metal or plastic snaps, buttons, magnets, and metal or plastic buckles, without exceeding the scope of the invention. Alternatively, blanket 10 could be provided with one portion of the hook and loop fastener and the mating portion attached to a portion of restraint system R such the blanket 10 is affixed in place by aligning said portions of the hook and loop fastener.

It should similarly be understood that the use of flexible straps is shown and described because this is the preference of the inventors. Other structures that are well known to those of skill in that art and that would serve to prevent the infant from (i) kicking or throwing blanket 10 off of the itself and the infant supporting apparatus A and (ii) lifting blanket 10 to cover its mouth and nostrils when engaged with restraint system R include, without limitation, clips, buckles, and hooks without exceeding the scope of the invention. It should be noted, however, that use of a blanket restraint mechanism that would involve the placement of a rigid material or a material having a significant thickness between an element of restraint system R and the infant could result in significant injury if not done properly, especially in the case of a moving impact, this being at least a factor in the inventors' preference for a flexible strap of insubstantial thickness.

Figure 1:
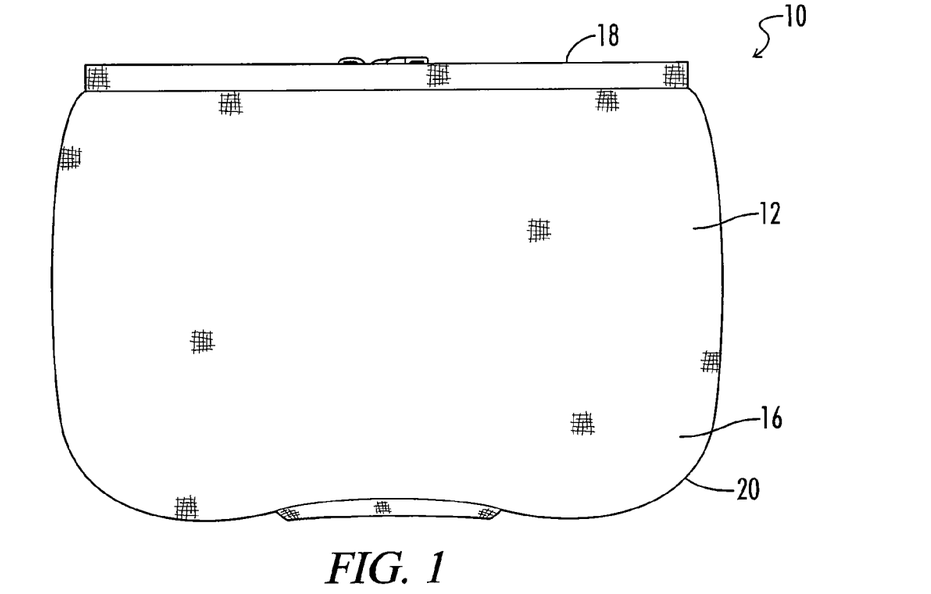
FIG. 1—is a top view of an embodiment of the invention.
Figure 2:
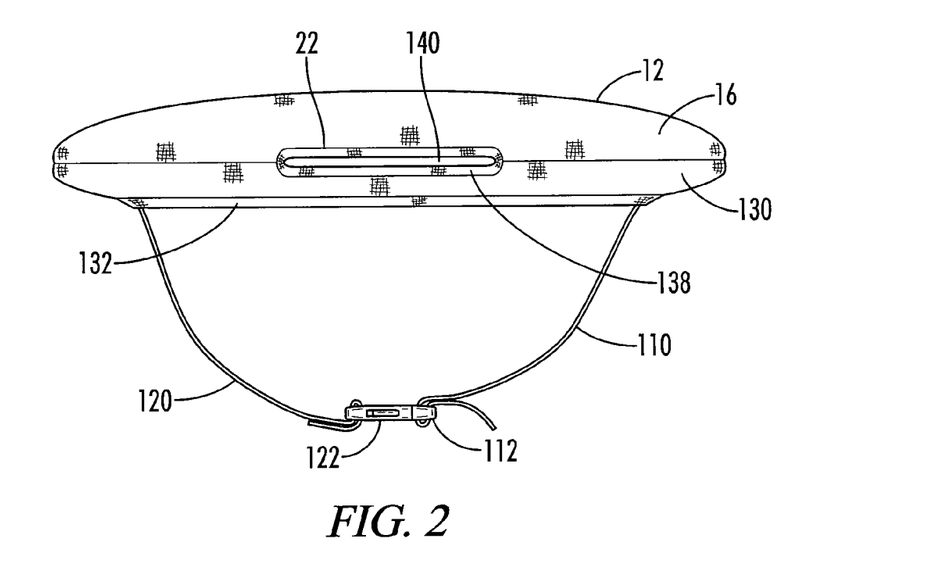
FIG. 2—is a front view of an embodiment of the invention.
Figure 3:
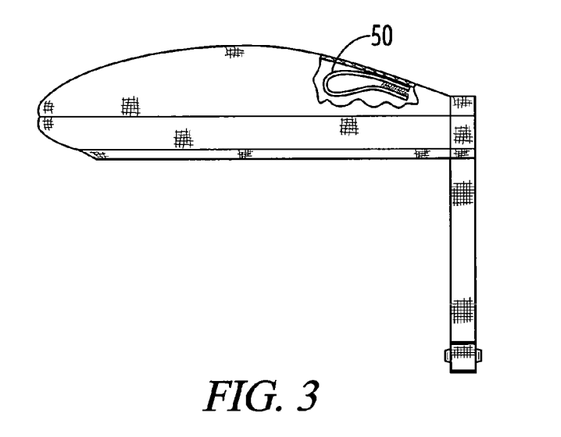
FIG. 3—is a right side view of an embodiment of the invention.
Figure 4:
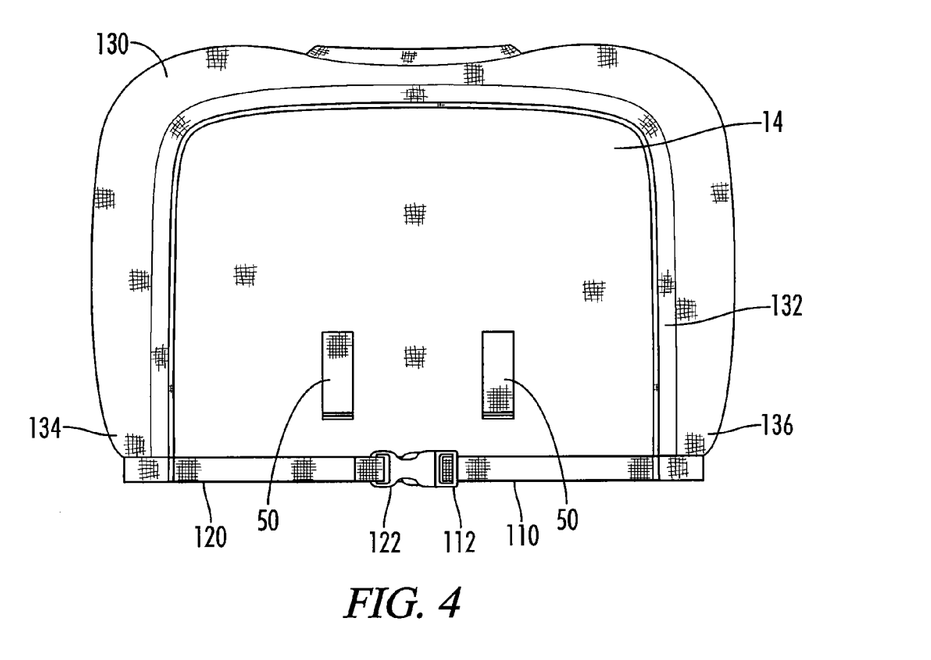
FIG. 4—is a bottom view of an embodiment of the invention.
Figure 5:
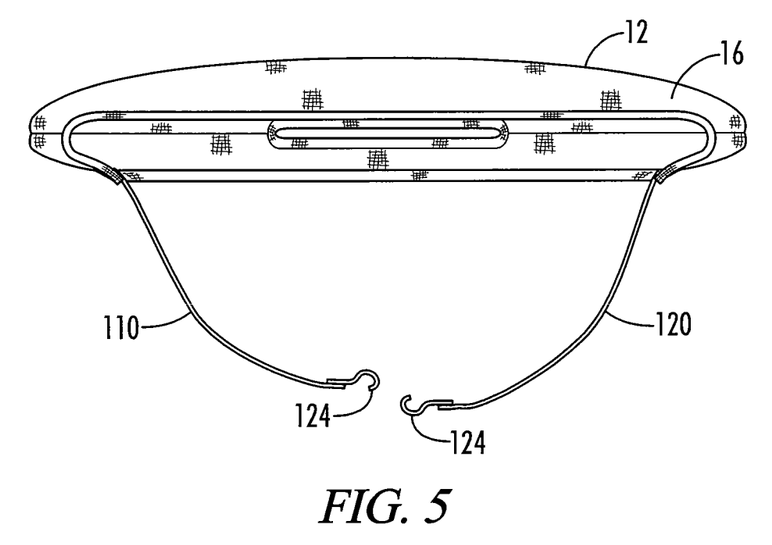
FIG. 5—is a rear view of an embodiment of the invention.
Figure 6:
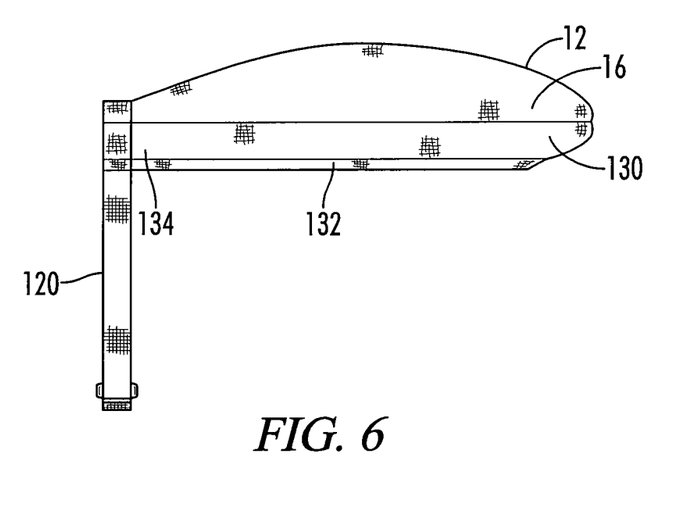
FIG. 6—is a left side view of an embodiment of the invention.

Blanket 10 further comprises belts 100 and 120 that extend from opposing end portions of upper perimeter portion 18 of flexible panel 12. Belts 110 and 120 are used to assist in holding blanket 10 in contact with the infant when blanket 10 is in use. In one embodiment of the invention, belts 110 and 120 include, respectively, adjustable male buckle portion 112 and adjustable female buckle portion 122, which are adapted to mate. By adjusting the positions of male buckle portion 112 and female buckle portion 122 along the length of belts 110 and 120 respectively, the effective lengths of belts 110 and 120 can be adjusted to permit belts 110 and 120 to extend around infant seating apparatus A and connect together. Belts 110 and 120 are preferably elastic and cooperate with upper perimeter portion 18 of flexible panel 12 to hold blanket 10 against the infant. The use of a buckle comprised of mating male and female portions was chosen as a convenience, it being well understood that there are many other known means of joining two belts together, including without limitation, snaps, buttons, and hook and loop fasteners, that could be alternately employed without exceeding the scope of the present invention. In an alternate embodiment, belts 110 and 120 are adapted to be affixed to a portion of the infant seating apparatus A to hold blanket 10 against the infant. One example of such an adaptation is the use of hooks 124, as best seen in FIG. 5 to engage infant seating apparatus A, although those of skill in the art will recognize that there are many other adaptations that would accomplish the same purpose without exceeding the scope of the present invention such as providing belts 110 and 120 with one portion of a hook and loop fastener with the corresponding portion of the hook and loop fastener affixed to the infant seating apparatus.

In the embodiment shown in FIGS. 11-15, the free end portions of belts 110 and 120 are provided with first portion 150 of a fastening system adjacent to second portion 152 of said fastening system 152. The free end portions of belts 110 and 120 can then be wrapped around a portion the infant seating apparatus A such that first portion 150 of said fastening system can be fastened to second portion 152 of said fastening system to affix blanket 10 to infant seating apparatus A. This embodiment may further locate second portion 152 of said fastening system on outer surface 16 of blanket 10 to supplement or replace second portion 152 of said fastening system on belts 110 and 120. In the illustrated embodiment, the fastening system is a hook and loop system, with first portion 150 being the hook portion and second portion 152 being the loop portion. Those of skill in the art will recognize that there are many other two part fastening systems that could be used as an alternative. Non-limiting examples of such systems include snaps where first portion 150 is the male portion and second portion 152 is the female portion and buttons where first portion 150 is a button hole and second portion 152 is a button.

In an alternate embodiment of the present invention, blanket 10 further comprises skirt 130 extending downward from lower perimeter portion 20 of flexible panel 12. In this embodiment, flexible panel 12 is preferably sized such that outer perimeter portion 20 extends beyond the edges of infant seating apparatus A. Skirt 130, thus, extends downward along exterior side portions of infant seating apparatus A to assist in keeping blanket 10 in place and to prevent drafts from blowing onto the infant. In the illustrated embodiment, skirt 130 further comprises elastic lower portion 132 that is opposite the portion of skirt 130 adjacent to flexible panel 12. In an alternate embodiment, not illustrated, skirt 130 comprises an elastic material such as spandex. To minimize the amount of material used and to facilitate manufacturing of blanket 10, skirt 130 may be formed of two or more separate pieces that are joined together at their adjacent end portions. To the extent that the opposing end portions 134 and 136 of skirt 130 align with upper perimeter portion 18 of flexible panel 12, opposing end portions 134 and 136 of skirt 130 are considered to be an extension of and part of upper perimeter portion 18 of flexible panel 12.

To permit blanket 10 to be conveniently used with an infant seating apparatus A that is a vibrating infant seat with controls located under the foot portion of the infant seating apparatus A, blanket 10 further comprises variable size opening 140. In the illustrated embodiment, variable size opening 140 is defined by elastic intermediate portion 22 of lower perimeter portion 20 of flexible panel and adjacent elastic intermediate portion 138 of skirt 130, said adjacent elastic portions of flexible panel 12 and skirt 130 not being joined together. Said elastic portions can be expanded to enable variable size opening 140 to receive the controls for the infant seating apparatus A and released to enable variable size opening 140 to fit snuggly against said controls. Alternatively, variable size opening 140 may be defined entirely by skirt 130 by forming an opening in skirt 130 wherein the portion of skirt 130 surrounding said opening further comprises an elastic material. (Where skirt 130 is wholly formed from an elastic material, then variable size opening 140 will by definition be surrounded by an elastic material.)

Where blanket 10 does not include skirt 130, variable size opening 140 may be defined in fabric panel 12. In such an embodiment, an opening is formed in flexible panel 12 wherein the portion of flexible panel 12 surrounding said opening further comprises an elastic material.

The foregoing described embodiments are exemplary in nature and are not intended to limit the scope of the invention.

We claim:

1. A blanket for covering an infant in an infant supporting apparatus having one or more restraints to retain the infant in said infant supporting apparatus, said blanket comprising:
   a flexible panel having an interior surface that is adjacent to the infant when said blanket is in use, the flexible panel further comprising
      an upper perimeter portion and
      a lower perimeter portion extending from a first end portion of the upper perimeter portion to an opposing second end portion of the upper perimeter portion;
   at least one strap for attaching said blanket to at least one of said one or more restraints, said at least one strap being affixed to the flexible panel and adjacent to the interior surface of the flexible panel such that when said at least one strap is engaged with at least one of said one or more restraints the blanket cannot be pulled up to cover the infant's nose and mouth;
   a first belt affixed to the first end portion of the upper perimeter portion of the flexible panel;
   a second belt affixed to the second end portion of the upper perimeter portion of the flexible panel; and
   a skirt, said skirt extending downward from the lower perimeter portion of the flexible panel wherein said skirt cooperates with said lower perimeter portion to define a variable size opening in said blanket,
   wherein each of the upper perimeter portion, the first belt, and the second belt further comprise an elastic material.

2. The blanket of claim 1 wherein said skirt further comprises an elastic material.

3. The blanket of claim 1 wherein said skirt further comprises an upper, non-elastic portion and a lower, elastic portion.

4. The blanket of claim 3 wherein the skirt further comprises
   a first panel and a second panel, wherein
      the first side panel extends downward from the lower perimeter portion of the flexible panel from the first end portion of the upper perimeter portion of the flexible panel to an intermediate point of the lower perimeter portion;
      the second panel extends downward from said intermediate point of the lower perimeter portion of the flexible panel to the second end portion of the upper perimeter portion of the flexible panel; and
      end portions of the first panel and the second panel are joined together.

5. A blanket for covering an infant in an infant seat having a restraint system to retain the infant in the seat, said blanket comprising:
   a flexible panel having a perimeter portion and an interior surface, said perimeter portion having an upper perimeter portion and a lower perimeter portion, said lower perimeter portion extending from a first end portion of the upper perimeter portion to a second, opposing end portion of the upper perimeter portion;
   a skirt, said skirt extending downward from the lower perimeter portion of said flexible panel; and
   at least one strap for attaching said blanket to said restraint system, said at least one strap being affixed to the interior surface of the flexible panel.

6. The blanket of claim 5 wherein the flexible panel and the skirt cooperate to define a flexible size opening in said blanket.

7. The blanket of claim 6 wherein said at least one strap is located such that the blanket cannot be pulled up to cover the infant's nose and mouth.

8. The blanket of claim 7 wherein said one or more straps further comprise two straps.

9. The blanket of claim 8 further wherein the flexible panel, the first side panel, and the second side panel cooperate to define a flexible size opening in said blanket.

10. The blanket of claim 8 further comprising:
    a first belt extending outward from the first end portion of the upper perimeter portion of the flexible panel and
    a second belt extending outward from the second end portion of the upper perimeter portion of the flexible panel.

11. The blanket of claim 5 wherein the skirt further comprises
    a first panel and a second panel, wherein
       the first side panel extends downward from the lower perimeter portion of the flexible panel from the first end portion of the upper perimeter portion of the flexible panel to an intermediate point of the lower perimeter portion;

the second panel extends downward from said intermediate point of the lower perimeter portion of the flexible panel to the second end portion of the upper perimeter portion of the flexible panel; and end portions of the first panel and the second panel are joined together at said intermediate point of the lower perimeter portion of the flexible panel.

12. A blanket for covering an infant in an infant seat, said seat having a restraint system to retain the infant in the seat, said blanket comprising:

a flexible panel having a perimeter portion and an interior surface, said perimeter portion having an upper perimeter portion and a tower perimeter portion, said lower perimeter portion extending from a first end portion of the upper perimeter portion to a second opposing end portion of the upper perimeter portion;

a skirt, said skirt extending downward from the lower perimeter portion of said flexible panel, wherein said skirt further comprises an upper, non-elastic portion and a lower, elastic portion and the flexible panel and the skirt cooperate to define a variable size opening in said blanket;

two straps for attaching said blanket to said restraint system, each of said two straps being affixed to the interior surface of the flexible panel and located to preclude the blanket from being pulled up to cover the infant's nose and mouth;

a first belt extending outward from the first end portion of the upper perimeter portion of the flexible panel, said first belt further comprising an elastic material; and a second belt extending outward from the first end portion of the upper perimeter portion of the flexible panel, said second belt further comprising an elastic material.

* * * * *